(12) United States Patent
Chen

(10) Patent No.: US 7,556,431 B2
(45) Date of Patent: Jul. 7, 2009

(54) DURABLE AND PRECISE LINEAR SLIDE

(76) Inventor: Hsi-Kuan Chen, No. 27, Tung-Hai St., Tung-Hai Tsun, Lung-Ching Hsiang, Taichung Hsien (TW)

(*) Notice: Subject to any disclaimer, the term of this patent is extended or adjusted under 35 U.S.C. 154(b) by 324 days.

(21) Appl. No.: 11/555,717

(22) Filed: Nov. 2, 2006

(65) Prior Publication Data
US 2008/0107364 A1 May 8, 2008

(51) Int. Cl.
*F16C 29/06* (2006.01)
(52) U.S. Cl. .................... 384/48; 384/44; 384/45
(58) Field of Classification Search .......... 384/43–45, 384/48, 49
See application file for complete search history.

(56) References Cited

U.S. PATENT DOCUMENTS

| | | | | |
|---|---|---|---|---|
| 4,902,143 A * | 2/1990 | Morita | ............ | 384/43 |
| 4,988,215 A * | 1/1991 | Osawa | ............ | 384/44 |
| 5,005,987 A * | 4/1991 | Morita | ............ | 384/43 |
| 5,123,754 A * | 6/1992 | Tanaka | ............ | 384/45 |
| 5,273,365 A * | 12/1993 | Kondoh | ............ | 384/44 |
| 6,109,789 A * | 8/2000 | Chen | ............ | 384/48 |
| 6,231,238 B1 * | 5/2001 | Teramachi | ............ | 384/45 |

* cited by examiner

*Primary Examiner*—Thomas R Hannon
(74) *Attorney, Agent, or Firm*—Banner & Witcoff, Ltd.

(57) ABSTRACT

A linear slide includes an elongate guide rail, a sliding block, a pair of ball roller chains, and a pair of cylindrical roller chains. Each of the ball and cylindrical roller chains is disposed between the elongate guide rail and the sliding block to thereby permit the sliding block to slide along the elongate guide rail.

2 Claims, 11 Drawing Sheets

DURABLE AND PRECISE LINEAR SLIDE

BACKGROUND OF THE INVENTION

1. Field of the Invention

This invention relates to a linear slide, more particularly to a linear slide that is durable and that has a high degree of precision.

2. Description of the Related Art

FIG. 1 illustrates a conventional linear slide 1 that includes an elongate guide rail 11, a sliding block 12, and a pair of ball roller chain units 14. The elongate guide rail 11 has a cross-section that is generally rectangular in shape, and has opposite lateral surfaces 112, and a top surface 111 that interconnects the lateral surfaces 112. The sliding block 12 is slidable along the length of the elongate guide rail 11, has a cross-section that is generally U-shaped, and has opposite vertical parts 122, and a horizontal part 121 that interconnects the vertical parts 122. Each of the horizontal and vertical parts 121, 122 of the sliding block 12 confronts a respective one of the top and lateral surfaces 111, 112 of the elongate guide rail 11. Each of the ball roller chain units 14 is disposed between a respective one of the lateral surfaces 112 of the elongate guide rail 11 and a respective one of the vertical parts 122 of the sliding block 12. The construction as such permits the conventional linear slide 1 to achieve a high degree of precision in terms of a linear motion of the sliding block 12 along the elongate guide rail 11.

The conventional linear slide 1 is disadvantageous in that, when a downward force (F1) is applied to the horizontal part 121 of the sliding block 12, the ball roller chain units 14 bear an entire amount of the downward force. This results in a relatively short service life for the ball roller chain units 14.

It has been proposed heretofore to replace the ball roller chain units 14 with cylindrical roller chain units 15, as illustrated in FIG. 2, to solve the above problem. This, however, can cause other problems. That is, the high degree of precision required for the linear motion of the sliding block 12 along the elongate guide rail 11 is undesirably compromised.

In U.S. Pat. No. 6,109,789, there is disclosed a conventional linear slide that includes the elongate slide rail, the sliding block, a pair of the ball roller chains, and a pair of the cylindrical roller chains. Each of the ball roller chains is disposed between a respective one of the lateral surfaces of the elongate guide rail and a respective one of the vertical parts of the sliding block. The cylindrical roller chains are disposed between the top surface of the elongate guide rail and the horizontal part of the sliding block.

Although the ball roller chains provide the high degree of precision required for the linear motion of the sliding block along the elongate guide, and the cylindrical roller chains, which bear a large amount of the downward force, at the same time, facilitate lengthening of the service life of the ball roller chains, when an upward force is applied to the horizontal part of the sliding block, the ball roller chains bear an entire amount of the upward force. This, likewise, results in a relatively short service life for the ball roller chains.

SUMMARY OF THE INVENTION

Therefore, the object of the present invention is to provide a linear slide that can overcome the aforesaid drawbacks of the prior art.

According to the present invention, a linear slide comprises an elongate guide rail, a sliding block, a pair of ball roller chains, and a pair of cylindrical roller chains. The elongate guide rail has opposite lateral surfaces, and a top surface that interconnects the lateral surfaces thereof. The sliding block is slidable along the elongate guide rail, and includes opposite vertical parts and a horizontal part. Each of the vertical parts of the sliding block confronts a respective one of the lateral surfaces of the elongate guide rail. The horizontal part interconnects the vertical parts and confronts the top surface of the elongate guide rail. Each of the ball roller chains is disposed between the elongate guide rail and the sliding block. Each of the cylindrical roller chains is disposed between a respective one of the lateral surfaces of the elongate guide rail and a respective one of the vertical parts of the sliding block.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
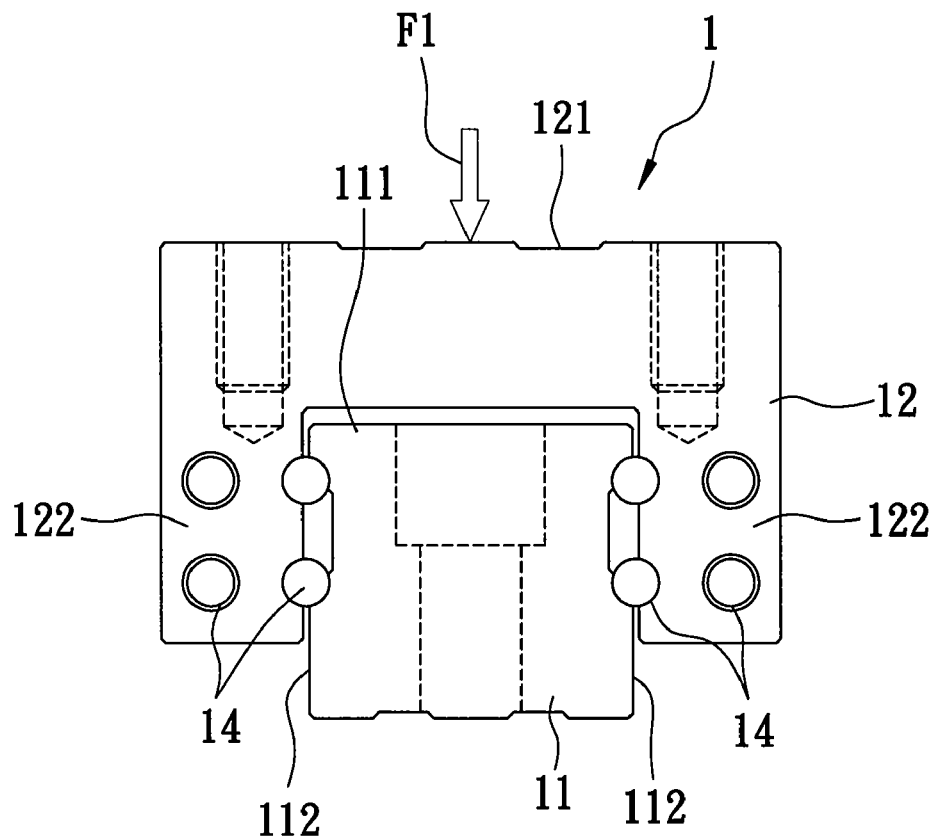
FIG. 1 is a schematic view of a conventional linear slide that employs ball roller chains.
Figure 2:
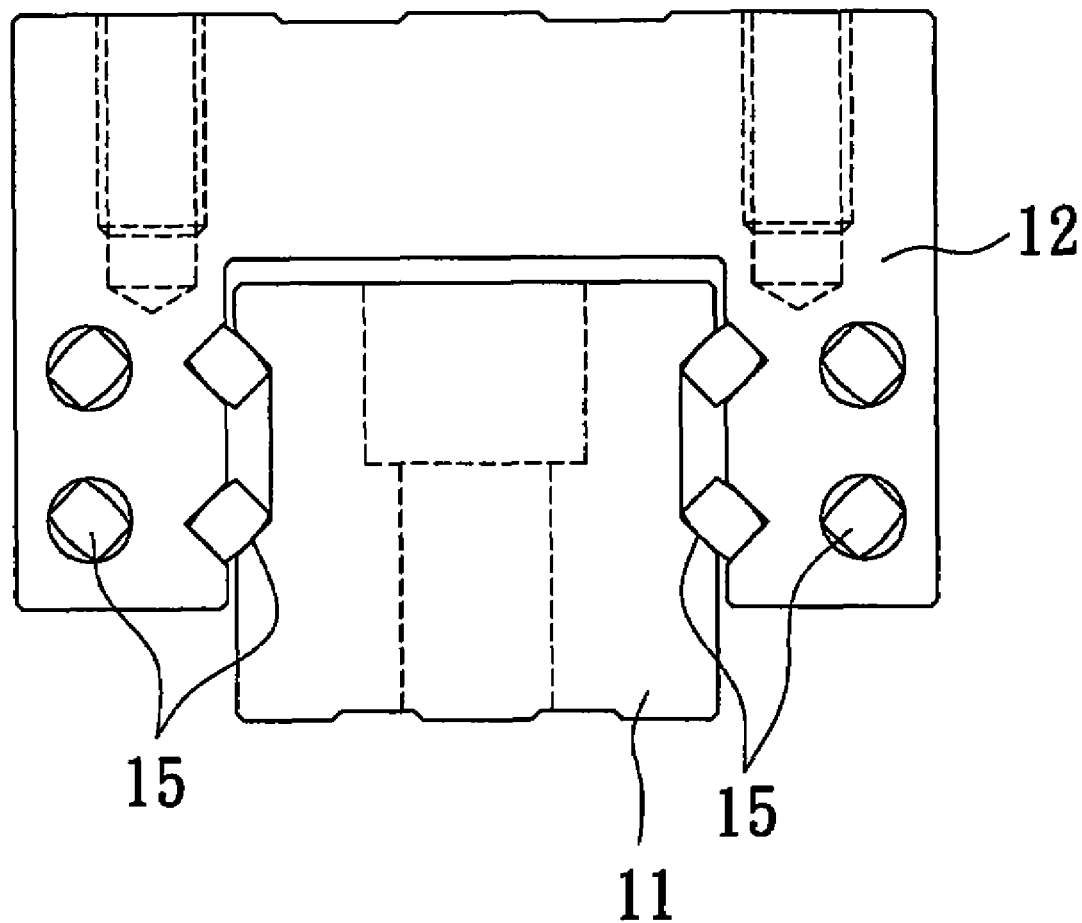
FIG. 2 is a schematic view of another conventional linear slide that employs cylindrical roller chains.

Before the present invention is described in greater detail, it should be noted that like elements are denoted by the same reference numerals throughout the disclosure.

Figure 3:
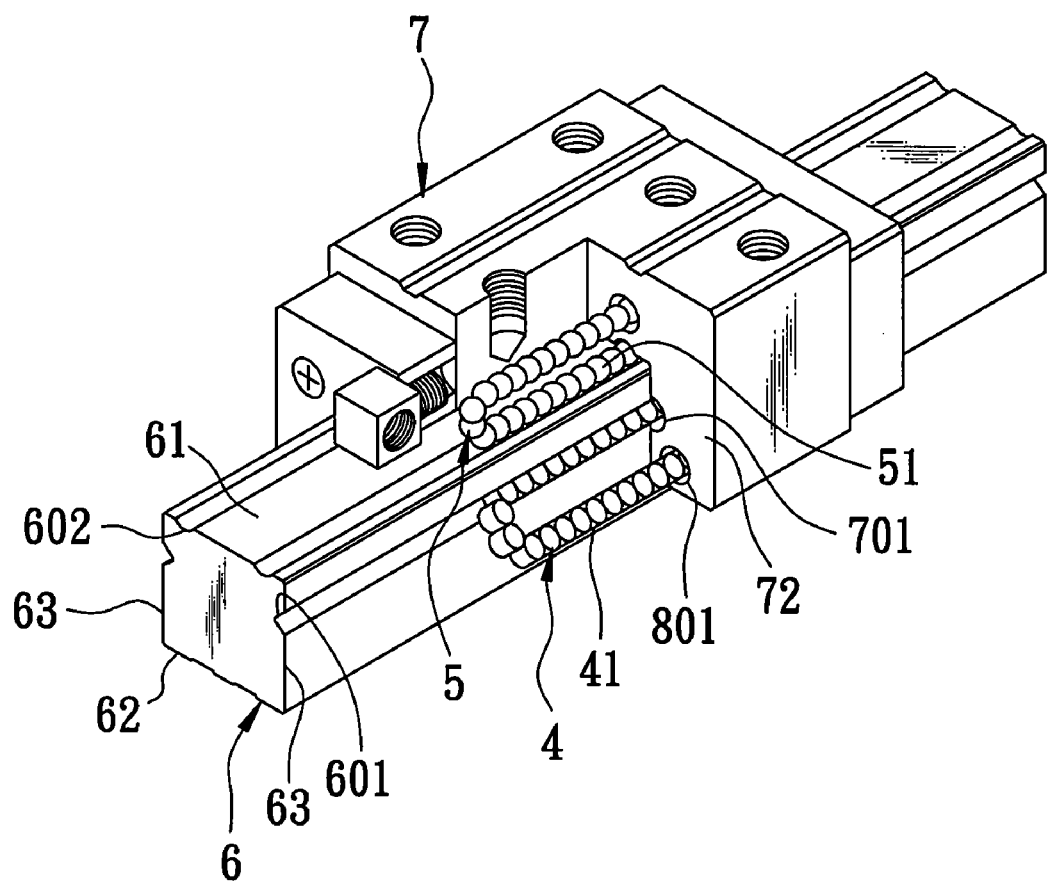
FIG. 3 is a cutaway perspective view of the first preferred embodiment of a linear slide according to the present invention.
Figure 4:
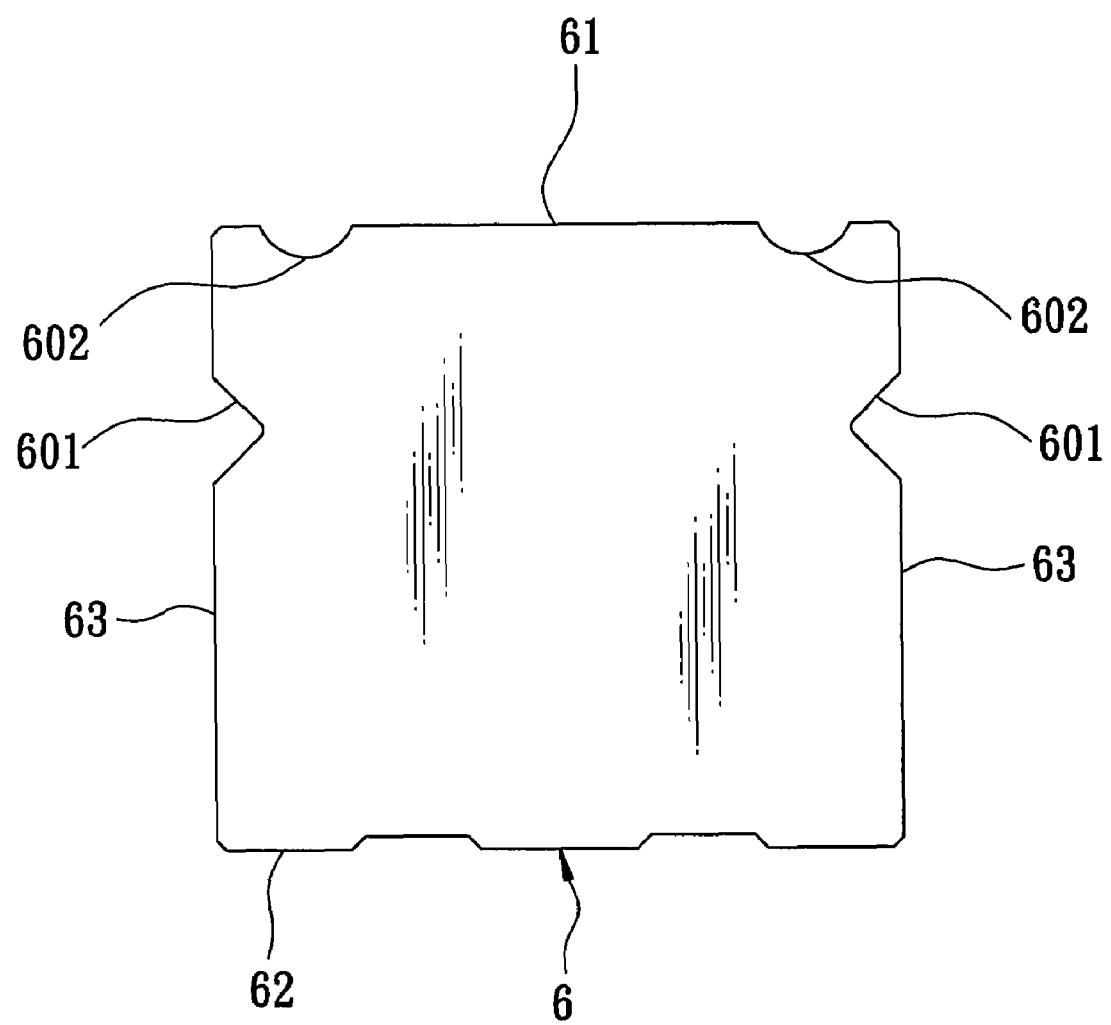
FIG. 4 is a schematic view to illustrate an elongate guide rail of the first preferred embodiment.
Figure 5:
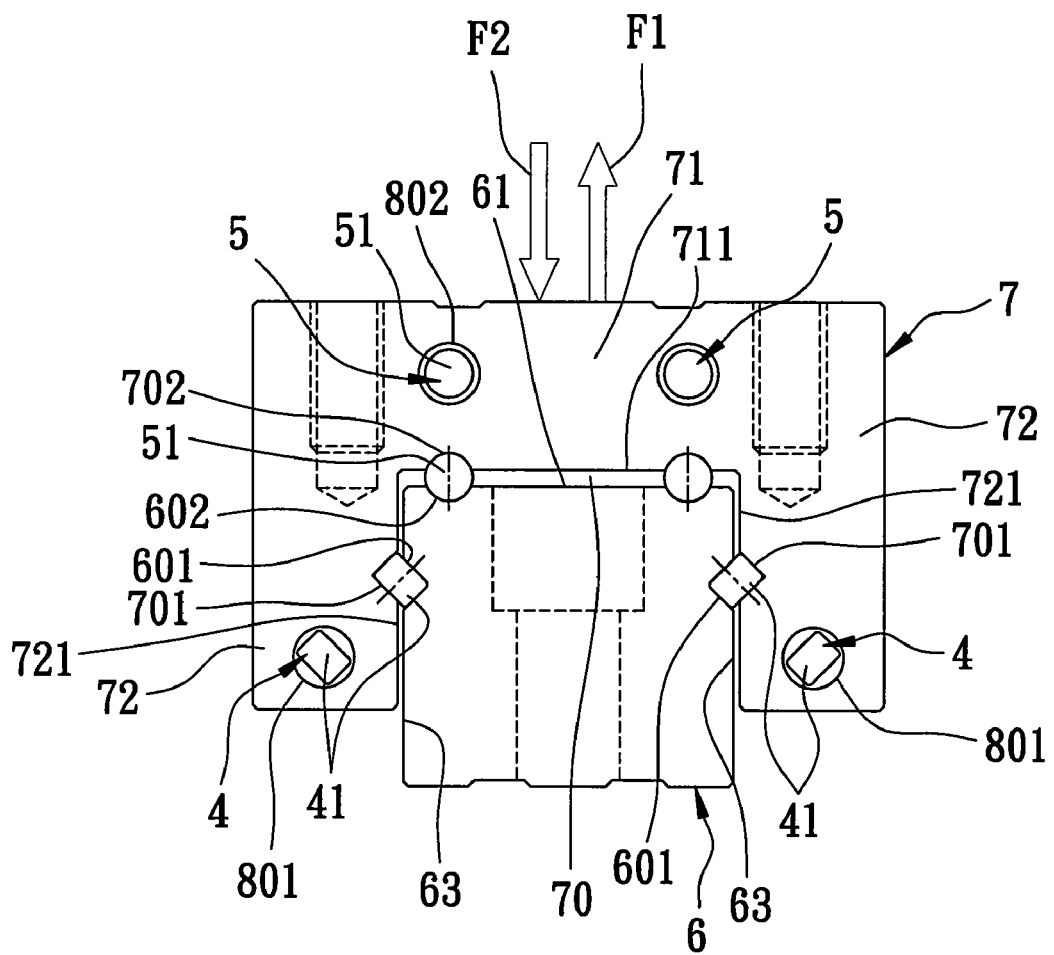
FIG. 5 is a schematic view to illustrate the first preferred embodiment in a state of use.

Referring to FIGS. 3 to 5, the first preferred embodiment of a linear slide according to this invention is shown to include an elongate guide rail 6, a sliding block 7, a pair of cylindrical roller chains 4, and a pair of ball roller chains 5.

The elongate guide rail 6 has a cross-section that is generally rectangular in shape, and has opposite lateral surfaces 63, and top and bottom surfaces 61, 62, each of which interconnects the lateral surfaces 63.

The sliding block 7 is slidable along the length of the elongate guide rail 6, has a cross-section that is generally U-shaped, and has opposite vertical parts 72, and a horizontal part 71 that interconnects the vertical parts 72. The horizontal and vertical parts 71, 72 of the sliding block 7 cooperatively define an accommodating space 70 there among. The elongate guide rail 6 is disposed in the accommodating space 70 in the sliding block 7 such that an inner surface 711, 721 of each of the horizontal and vertical parts 71, 72 of the sliding block 7 confronts a respective one of the top and lateral surfaces 61, 63 of the elongate guide rail 6.

Each of the cylindrical roller chains 4 includes a series of linked cylindrical-shaped members 41, and is disposed between a respective one of the lateral surfaces 63 of the elongate guide rail 6 and a respective one of the vertical parts 72 of the sliding block 7. In particular, the inner surface 721 of each of the vertical parts 72 of the sliding block 7 is formed with a first groove 701. Each of the vertical parts 72 of the sliding block 7 is formed with a first through-hole 801 that is parallel to the first groove 701 in the inner surface 721 of a respective one of the vertical parts 72 of the sliding block 7. Each of the lateral surfaces 63 of the elongate guide rail 6 is formed with a second groove 601 that confronts the first groove 701 in the inner surface 721 of a respective one of the vertical parts 72 of the sliding block 7. Each of the confronting pairs of the first groove 701 and the second groove 601 defines a second through-hole. Each of the cylindrical roller chains 4 extends through a respective one of the first through-holes 801 and a respective one of the second through-holes.

Each of the ball roller chains 5 includes a series of linked ball-shaped members 51, and is disposed between the top surface 61 of the elongate guide rail 6 and the horizontal part 71 of the sliding block 7. In particular, the inner surface 711 of the horizontal part 71 of the sliding block 7 is formed with a pair of third grooves 702. The horizontal part 71 of the sliding block 7 is formed with a pair of third through-holes 802, each of which is parallel to a respective one of the third grooves 702 in the inner surface 711 of the horizontal part 71 of the sliding block 7. The top surface 61 of the elongate guide rail 6 is formed with a pair of fourth grooves 602, each of which confronts a respective one of the third grooves 702 in the inner surface 711 of the horizontal part 71 of the sliding block 7. Each of the confronting pairs of the third groove 702 and fourth groove 602 defines a fourth through-hole. Each of the ball roller chains 5 extends through a respective one of the third through-holes 802 and a respective one of the fourth through-holes. The construction as such permits the linear slide of this invention to achieve a high degree of precision in terms of a linear motion of the sliding block 7 along the elongate guide rail 6.

In use, as best shown in FIG. 5, when an upward or downward force (F1, F2) is applied to the horizontal part 71 of the sliding block 7, each of the cylindrical roller chains 4 bears a large amount of the force. This results in a relatively long service life for the ball roller chains 5.

Figure 6:
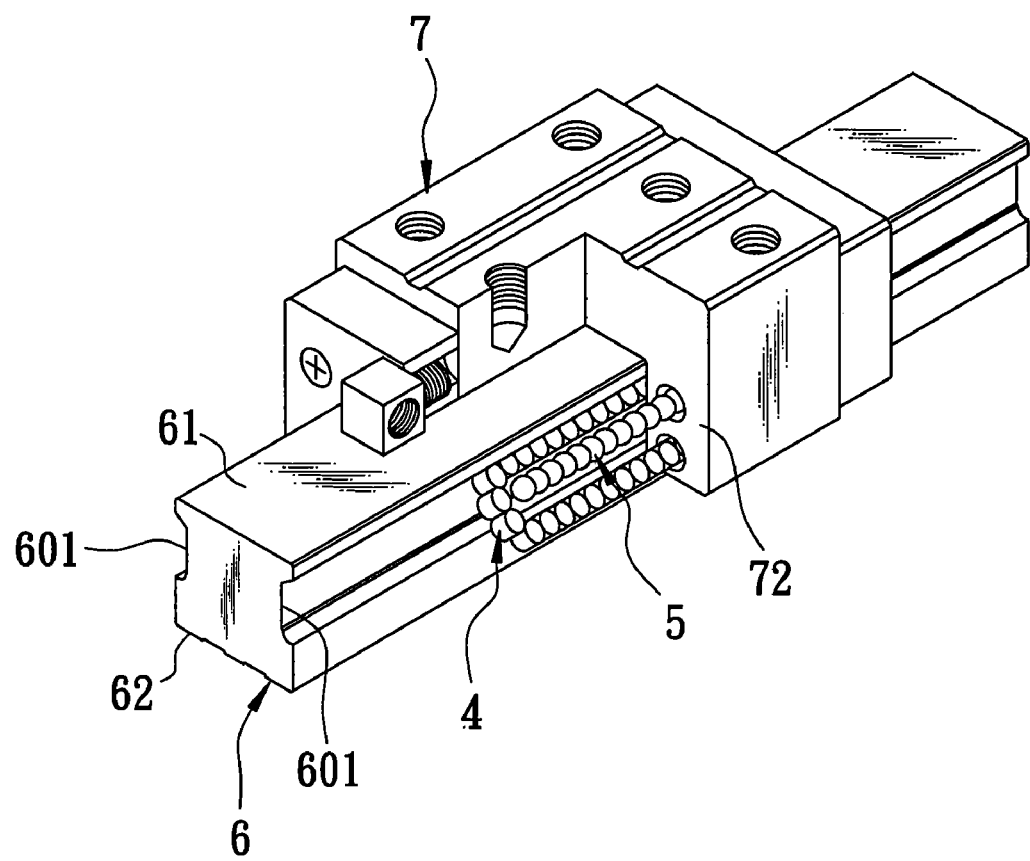
FIG. 6 is a cutaway perspective view of the second preferred embodiment of a linear slide according to the present invention.
Figure 7:
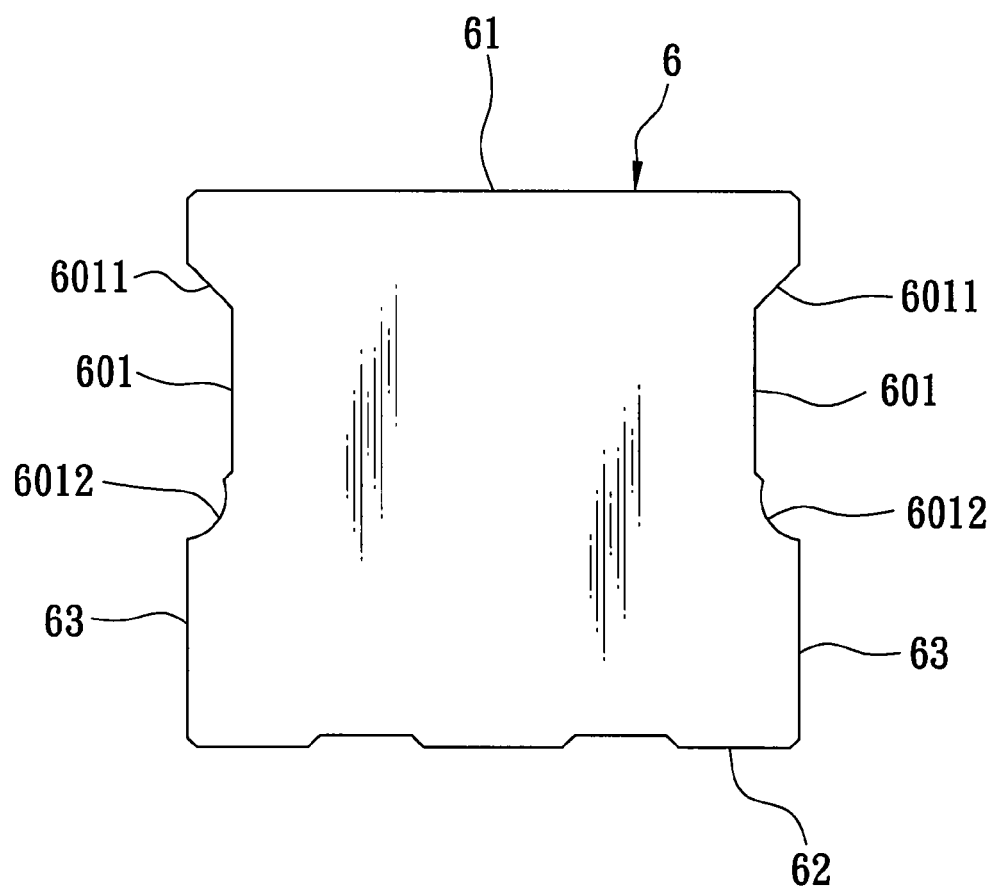
FIG. 7 is a schematic view to illustrate an elongate guide rail of the second preferred embodiment.
Figure 8:
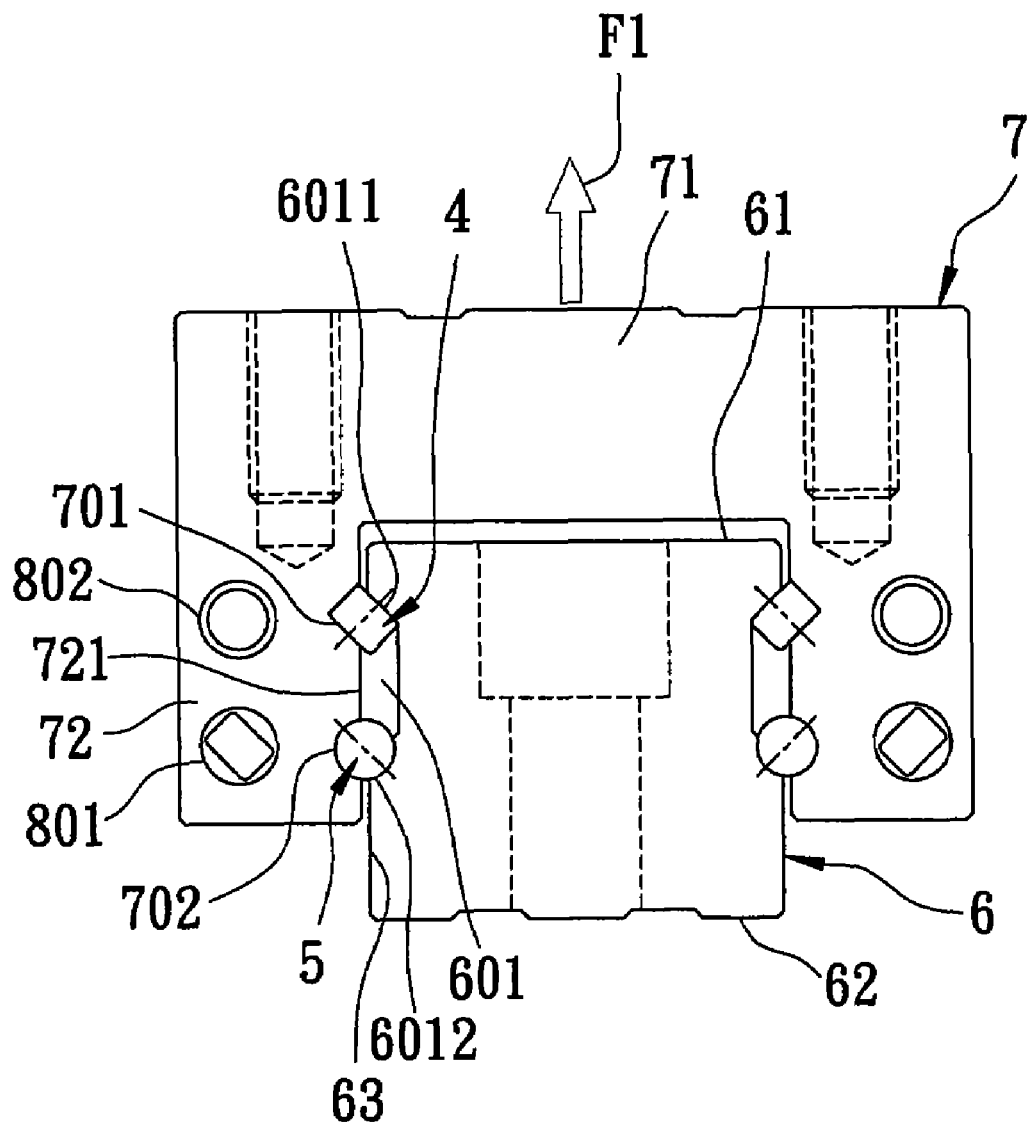
FIG. 8 is a schematic view of the second preferred embodiment in a state of use.

FIGS. 6 to 8 illustrate the second preferred embodiment of a linear slide according to this invention. When compared to the previous embodiment, the top surface 61 of the elongate guide rail 6 is dispensed with the fourth grooves 602 (see FIG. 4).

The second groove 601 in each of the lateral surfaces 63 of the elongate guide rail 6 has upper and lower end portions 6011, 6012 that are respectively proximate to and distal from the top surface 61 of the elongate guide rail 6.

The first groove 701 in the inner surface 721 of each of the vertical parts 72 of the sliding block 7 confronts the upper end portion 6011 of the second groove 601 in a respective one of the lateral surfaces 63 of the elongate guide rail 6.

Each of the third grooves 702 is formed in the inner surface 721 of a respective one of the vertical parts 72 of the sliding block 7, and confronts the lower end portion 6012 of the second groove 601 in a respective one of the lateral surfaces 63 of the elongate guide rail 6.

The third through-hole 802 is formed in each of the vertical parts 72 of the sliding block 7, and is parallel to the third groove 702 in the inner surface 721 of a respective one of the vertical parts 72 of the sliding block 7.

Each of the second through-holes is defined by a respective one of the confronting pairs of the first groove 701 and the upper end portion 6011 of the second groove 601.

Each of the cylindrical roller chains 4 extends through a respective one of the first through-holes 801 and a respective one of the second through-holes.

Each of the fourth through-holes is defined by a respective one of the confronting pairs of the third groove 702 and the lower end portion 6012 of the second groove 601.

Each of the ball roller chains 5 extends through a respective one of the third through-holes 802 and a respective one of the fourth through-holes.

In use, as best shown in FIG. 8, when an upward force (F1) is applied to the horizontal part 71 of the sliding block 7, each of the cylindrical roller chains 4 bears an entire amount of the upward force. This results in a relatively long service life for the ball roller chains 5.

Figure 9:
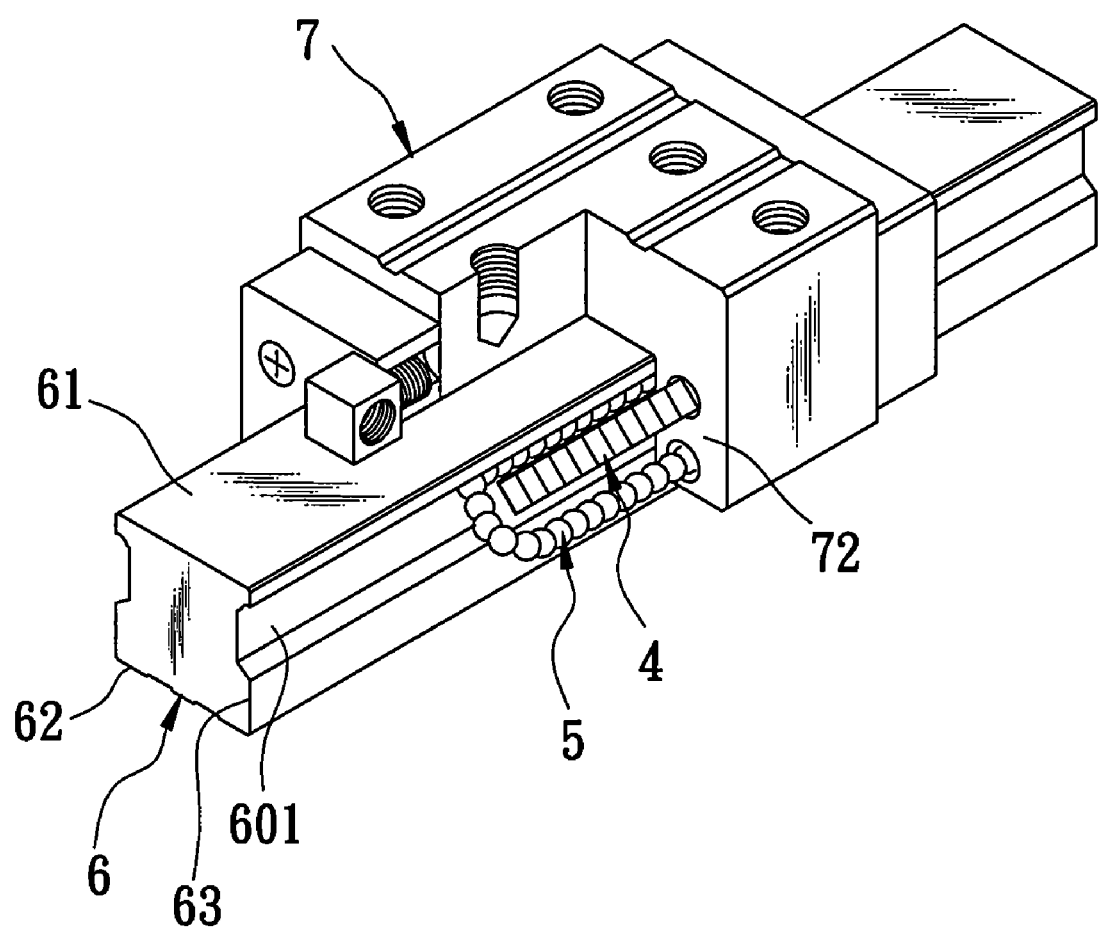
FIG. 9 is a cutaway perspective view of the third preferred embodiment of a linear slide according to the present invention.
Figure 10:
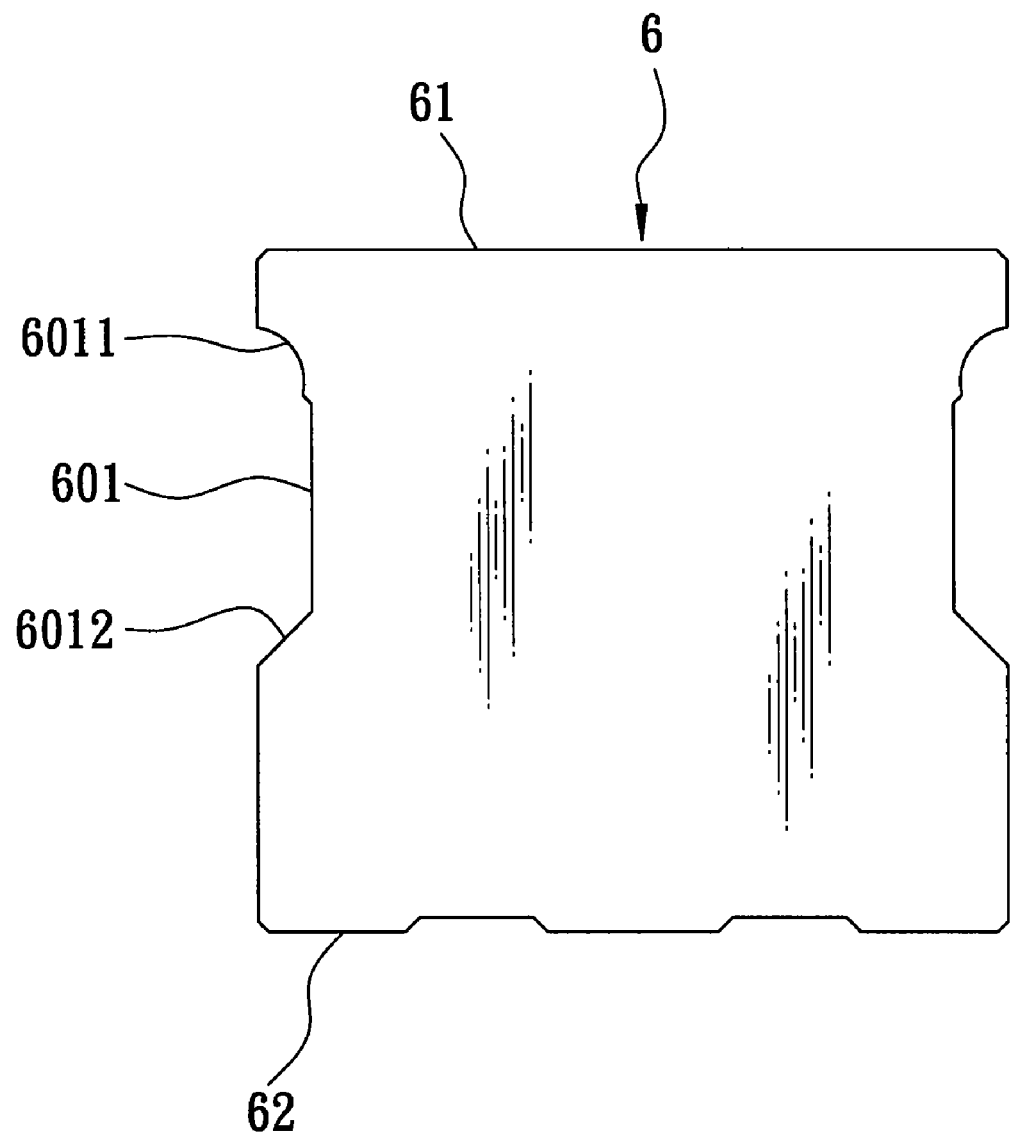
FIG. 10 is a schematic view to illustrate an elongate guide rail of the third preferred embodiment.
Figure 11:
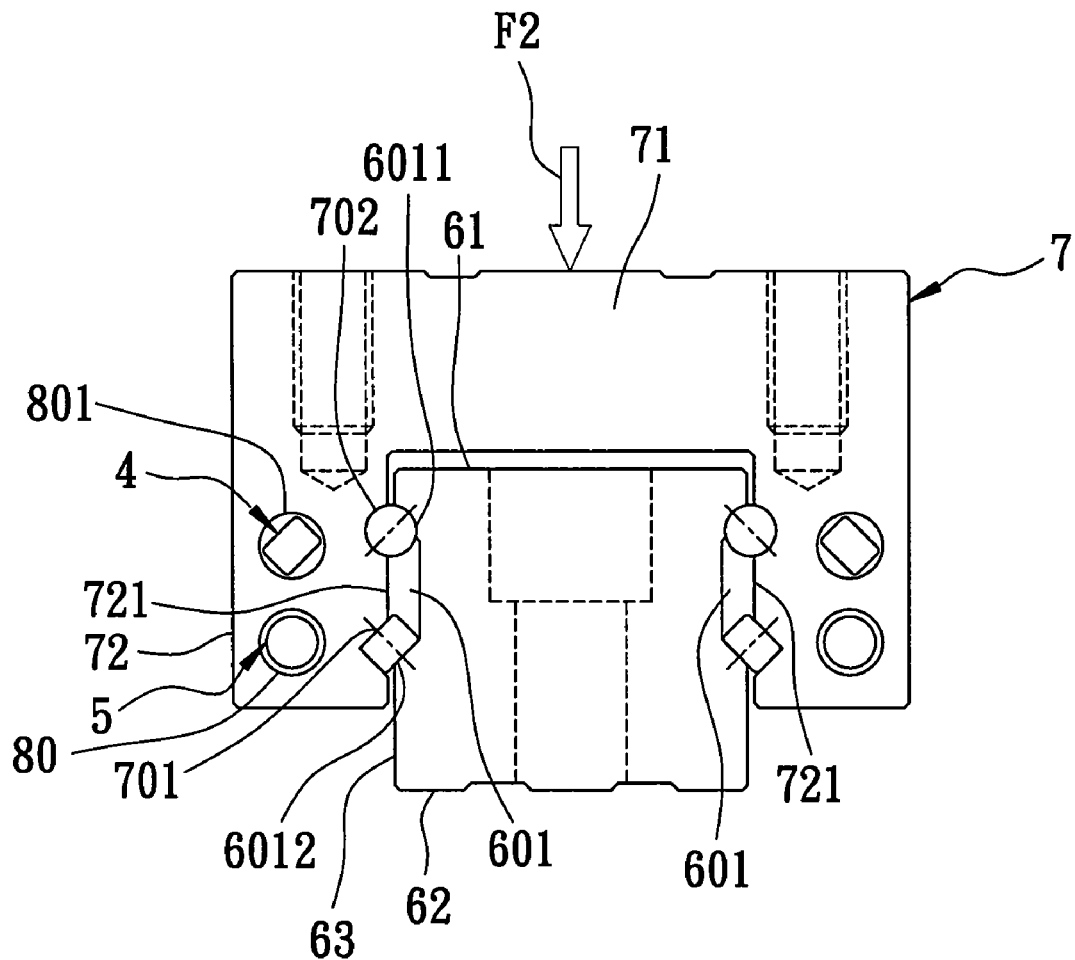
FIG. 11 is a schematic view of the third preferred embodiment in a state of use.

FIGS. 9 to 11 illustrate the third preferred embodiment of a linear slide according to this invention. When compared to the second embodiment, the first groove 701 in the inner surface 721 of each of the vertical parts 72 of the sliding block 7 confronts the lower end portion 6012 of the second groove 601 in a respective one of the lateral surfaces 63 of the elongate guide rail 6.

The third groove 702 in the inner surface 721 of each of the vertical parts 72 of the sliding block 7 confronts the upper end portion 6011 of the second groove 601 in a respective one of the lateral surfaces 63 of the elongate guide rail 6.

Each of the second through-holes is defined by a respective one of the confronting pairs of the first groove 701 and the lower end portion 6012 of the second groove 601.

Each of the cylindrical roller chains 4 extends through a respective one of the first through-holes 801 and a respective one of the second through-holes.

Each of the fourth through-holes is defined by a respective one of the confronting pairs of the third groove 702 and the upper end portion 6011 of the second groove 601.

Each of the ball roller chains 5 extends through a respective one of the third through-holes 702 and a respective one of the fourth through-holes.

In use, as best shown in FIG. 11, when a downward force (F2), is applied to the horizontal part 71 of the sliding block 7, each of the cylindrical roller chains 4 bears an entire amount of the downward force. This results in a relatively long service life for the ball roller chains 5.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A linear slide, comprising:
   an elongate guide rail having opposite lateral surfaces, and a top surface that interconnects said lateral surfaces thereof;
   a sliding block slidable along said elongate guide rail, said sliding block including opposite vertical parts, each of which confronts a respective one of said lateral surfaces of said elongate guide rail, and a horizontal part that interconnects said vertical parts and that confronts said top surface of said elongate guide rail;

a pair of ball roller chains, each of which is disposed between said elongate guide rail and said sliding block; and a pair of cylindrical roller chains, each of which is disposed between a respective one of said lateral surfaces of said elongate guide rail and a respective one of said vertical parts of said sliding block;

wherein each of said vertical parts of said sliding block has an inner surface that is formed with a first groove, and is formed with a first through-hole that is parallel to said first groove in said inner surface of a respective one of said vertical parts of said sliding block, each of said lateral surfaces of said elongate guide rail being formed with a second groove that confronts said first groove in said inner surface of the respective one of said vertical parts of said sliding block, each of said confronting pairs of said first and second grooves defining a second through-hole, each of said cylindrical roller chains extending through a respective one of said first through-holes and a respective one of said second through-holes;

wherein said horizontal part of said sliding block has an inner surface that is formed with a pair of third grooves, and is formed with a pair of third through-holes, each of which is parallel to a respective one of said third grooves in said inner surface of said horizontal part of said sliding block, said top surface of said elongate guide rail being formed with a pair of fourth grooves, each of which confronts a respective one of said third grooves in said inner surface of said horizontal part of said sliding block, each of said confronting pairs of said third and fourth grooves defining a fourth through-hole, each of said ball roller chains extending through a respective one of said third through-holes and a respective one of said fourth through-holes.

2. The linear slide as claimed in 1, wherein said second groove in each of said lateral surfaces of said elongate guide rail has upper and lower end portions that are respectively proximate to and distal from said top surface of said elongate guide rail, said first groove in said inner surface of each of said vertical parts of said sliding block confronting one of said upper and lower end portions of said second groove in a respective one of said lateral surfaces of said elongate guide rail, said inner surface of each of said vertical parts of said sliding block being further formed with a third groove that confronts the other of said upper and lower end portions of said second groove in a respective one of said lateral surfaces of said elongate guide rail, each of said vertical parts of said sliding block being further formed with a third through-hole that is parallel to said third groove in said inner surface of a respective one of said vertical parts of said sliding block, each of said second through-holes being defined by a respective one of said confronting pairs of said first groove and said one of said upper and lower end portions of said second groove, each of said confronting pairs of said third groove and the other of said upper and lower end portions of said second groove defining a fourth through-hole, each of said ball roller chains extending through a respective one of said third through-holes and a respective one of said fourth through-holes.

\* \* \* \* \*